United States Patent [19]

Brett

[11] 4,079,970
[45] Mar. 21, 1978

[54] PIPE SWITCHING STATION CLAMP
[75] Inventor: John Earl Brett, Toronto, Canada
[73] Assignee: Tri-Canada Cherry-Burrell Ltd., Toronto, Canada
[21] Appl. No.: 725,164
[22] Filed: Sep. 21, 1976
[51] Int. Cl.² .............................................. F16L 3/04
[52] U.S. Cl. ................................ 285/158; 285/137 R; 285/367
[58] Field of Search ................ 285/61, 62, 64, 137 R, 285/158, 157, 159, 189, 366, 367, 410, 420

[56] References Cited
U.S. PATENT DOCUMENTS

| | | | |
|---|---|---|---|
| 1,007,326 | 10/1911 | Boyd | 285/158 X |
| 1,191,617 | 7/1916 | Ruete | 285/189 |
| 2,749,149 | 6/1956 | Carpenter | 285/189 |

FOREIGN PATENT DOCUMENTS 5,908 of 1894 United Kingdom ................ 285/367
465,724 5/1937 United Kingdom ................ 285/367

Primary Examiner—Dave W. Arola

[57] ABSTRACT

A switching station for pipes has a panel equipped with projecting pipe ends designed for connection to the ends of other pipes by a clamp having a pair of members pivotally connected to each other about an axis of pivotal connection and designed and shaped to be pivotted relative to one another to clamp about the connected pipe ends. A clamp is provided corresponding to a projecting pipe end and mounted on the side of said panel on which said pipe end projects with the clamp arcuate members being pivotallymounted on the panel to pivot about the axis of pivotal projection relative to the panel. The pivotal mounting of the clamp members is located and dimensioned so that the clamp members may be swung into position to clamp about the corresponding pipe end and a pipe end to be connected thereto.

1 Claim, 7 Drawing Figures

PIPE SWITCHING STATION CLAMP

This invention relates to a convenient clamp arrangement for switching stations for fluid pipes.

In plants having a large volume of pipes whose connections may alter, it is customary to provide what are called switching panels. The switching panel provides a (usually) flat supporting board through which pipes project to open ends for connection to other pipes. The pipe ends may be part of a full pipe connection permanently made to the board. However, frequently the pipe ends are of short lengths of pipe projecting through the board with open ends on each side whereby pipes from plant equipment may be connected to one end of some of such pipe lengths whose other ends are connected by connectors to join two pieces of plant equipment together.

Although the invention was initially designed for switching panels, it may equally be used with a single pipe end on a mounting means, in clamping that pipe to another pipe.

The pipes with which the invention is used may be used in a very wide range of industries, including but not limited to the food and beverage industry on the one hand and industrial uses on the other.

The open pipe ends are customarily connected to the ends of other pipe lengths by means of a clamp comprising two members pivotally connected to form a clamp when tightened together and it is with this type of clamp that the invention is concerned. In this, the conventional method of coupling, the clamp is provided as a completely independent member from the two pipe ends being joined. Thus the coupling operation, usually performed by a single man, is very difficult, since he must support a pipe at its end, to be joined to the pipe end of the switching panel, bring it into registration with the panel mounted pipe end and, at the same time, support the clamp and perform the clamping operation.

The present invention reduces the number of manual operations necessarily performed by the workman effecting the junction between the pipe ends.

This is achieved, in accord with the invention, by mounting the pivotally connected clamp on the panel board in definite relationship to a pipe end on a panel board. It will be noted that the clamp used has two pivotally connected members. In accord with the invention, the clamp is pivotally mounted on the switching board to pivot relative thereto about an axis coincidental with the pivot connection of the clamp. The mounting is further designed so that the clamp members, while pivotting thereon may be moved to a position to clamp one of the pipe ends projecting therefrom to the end of another pipe and brought into registration therewith. The workman's job in connecting the pipes is therefore much simplified by the mounted clamp. In making a junction he does not have to support the panel board pipe end or the clamp. He merely has to support the pipe end which is clamped to the panel board pipe end, in registration therewith, swing the clamp members into position, and perform the clamping operation.

In drawings which show a preferred embodiment of the invention: a panel 10 is shown in a plant or factory having a large amount of piping and requiring from time to time, the disconnection of pipe connections and the formation of other connections. The drawings show a panel having 7 pipe ends 12 of pipes on each side. These are the ends of pipes permanently connected to the panel, to which other pipes are or may be connected.

Figure 5:
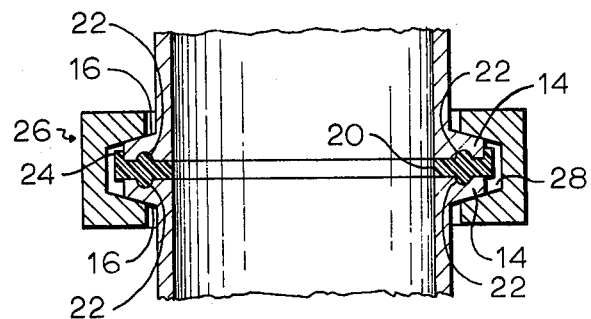
FIG. 5 shows a cross-section along the lines 5—5 of FIG. 4.
Figure 6:
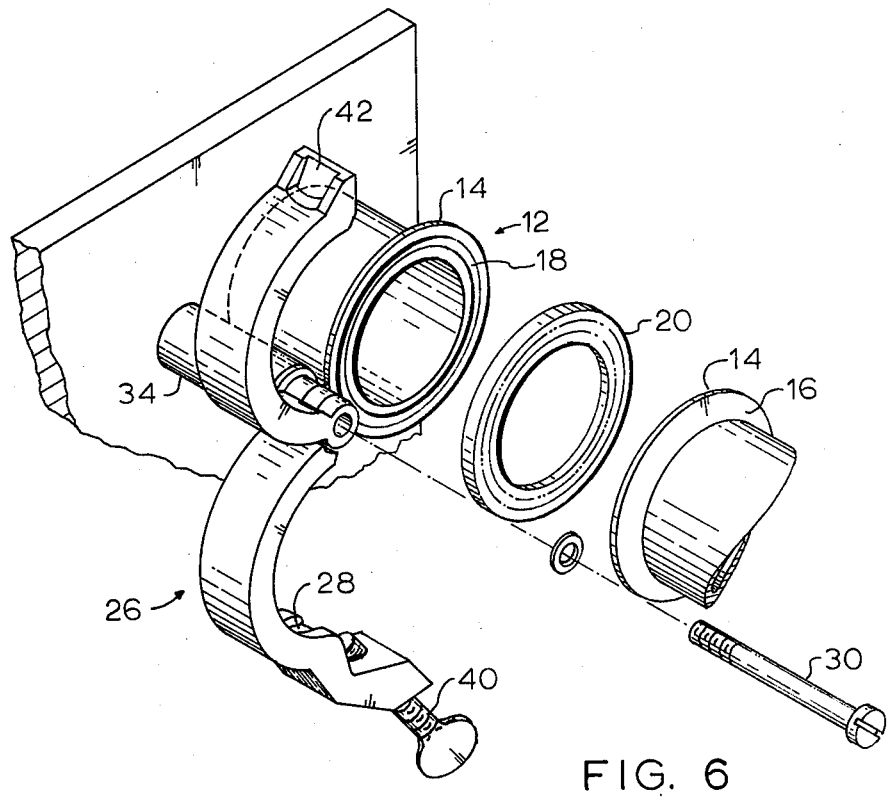
FIG. 6 is an exploded view of a joint to be clamped.

The details of the clamped joint are not important, since the invention will work with any clamp design which is clamped by two pivotally connected clamp members which clamp when pivotted into clamping position about the pipe ends, and tightened. However, it is desired to show one typical clamped joint. As best shown in FIGS. 5 and 6 each pipe end 12 to be clamped, terminates in an enlargement comprising an outwardly directed flange 14 with the inner flange surface 16 chamferred toward the pipe end in a radially outward direction. The face of the flange outwardly directed from the pipe end is provided with an annular groove 18. The two pipe ends to be joined are shown as identical although they need not be so. An annular rubber washer 20 is shaped to be located between the flange faces and is provided with ribs 22 complementary to and designed to fit and seal into the grooves 18 in the flange faces. A small axially directed flange 24 is located on the periphery of washer 20 and is designed to extend partially over the edge of one of the flanges 14. The clamp 26 is provided with an internally directed groove 28 having sloping sides designed to overlie the abutting flanges when the clamp members are closed, and when the clamp is tightened, to force the two pipe flanges 14 into tight clamping engagement with the rubber washer 20, compressing the latter.

Although the two pipe ends are shown as identical it will be obvious that these may be different with the washer suitably shaped to perform the sealing operation, or that the seal may be differently arranged, the criterion for use of the invention being that the joint is of the type to be clamped by a pivotted type of clamp member where two clamp members are pivotted into position and tightened relative to each other to perform the clamping operation.

Figure 1:
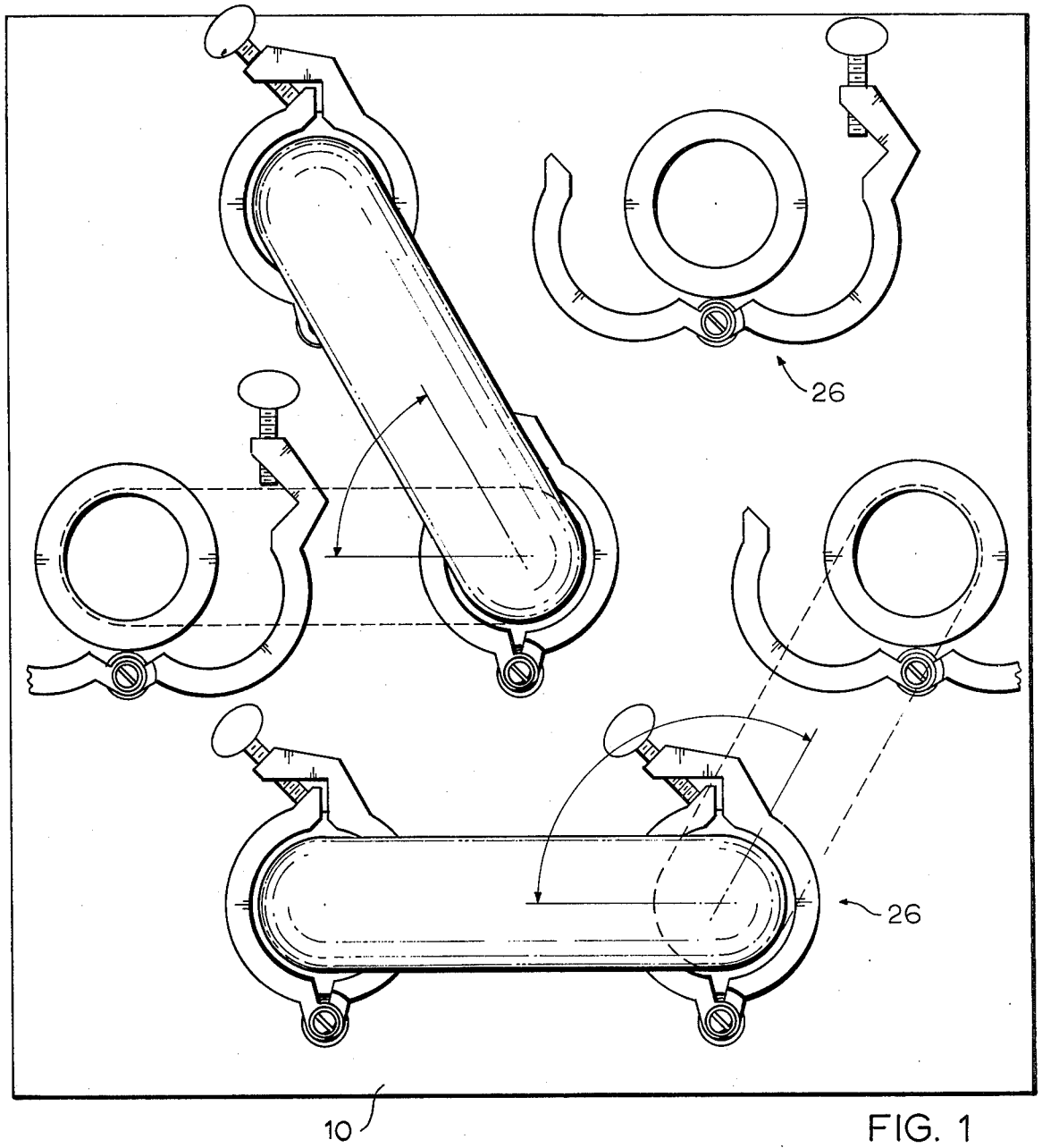
FIG. 1 shows the front of a switching station panel, the clamp pivot mountings are below the pipe ends to which they correspond.
Figure 1A:
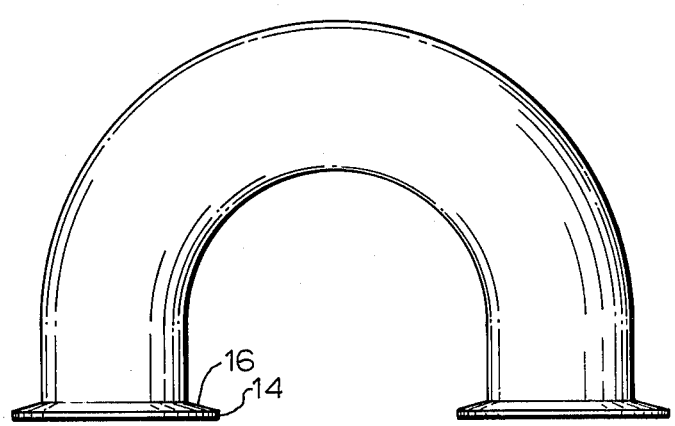
FIG. 1a shows a junction pipe for use with the panel of FIG. 1.
Figure 2:
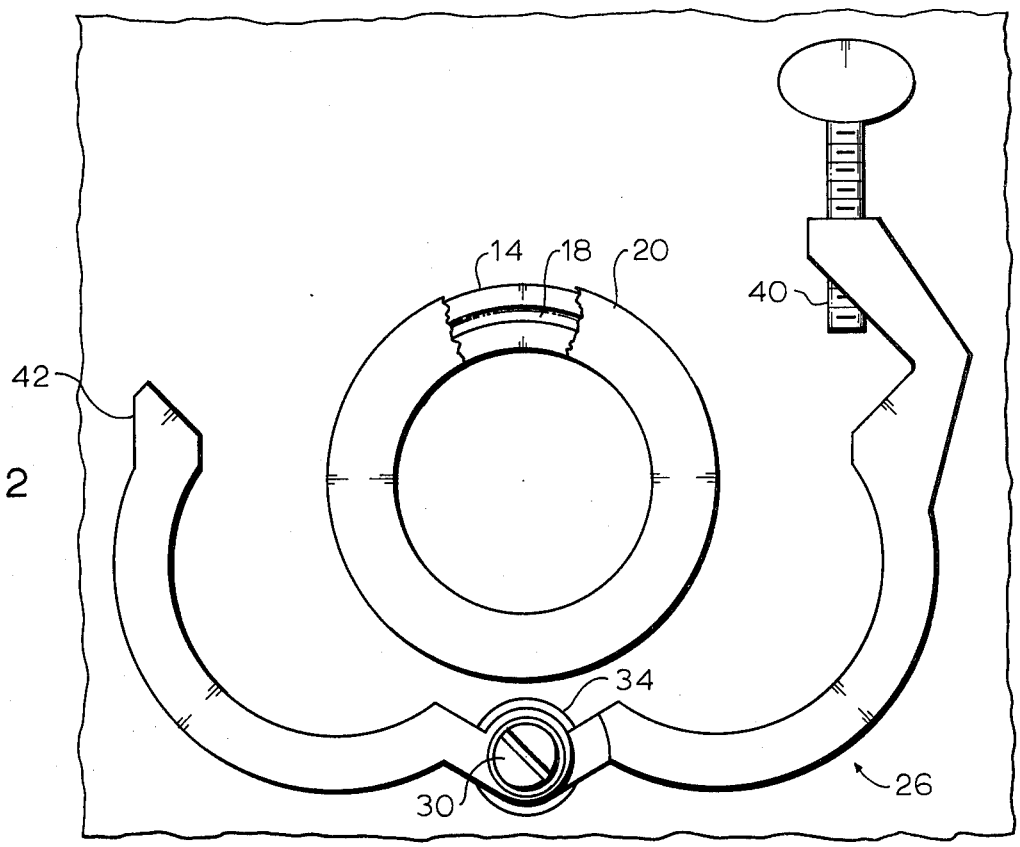
FIGS. 2 and 3 are views showing the clamping operation of a clamp.
Figure 3:
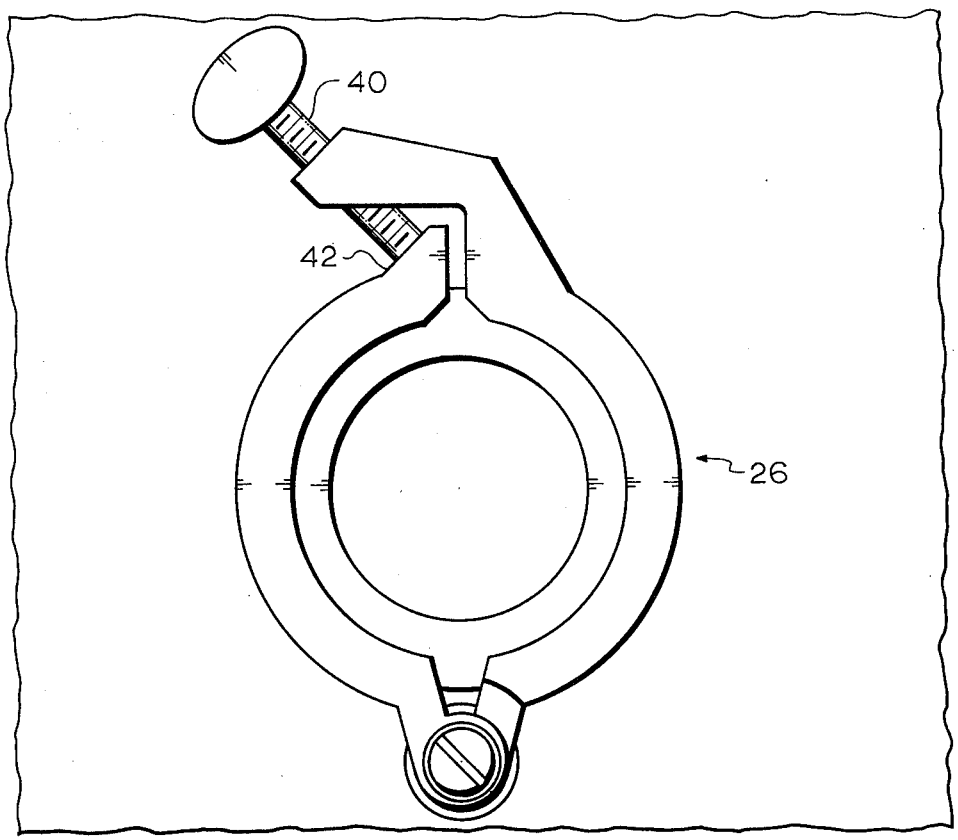
Figure 4:
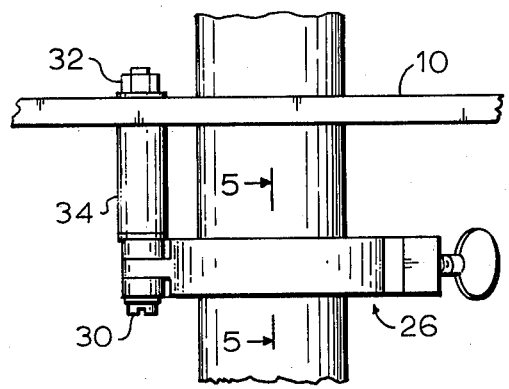
FIG. 4 shows a top view of a clamped pair of pipe ends.

In accord with the invention, the panel, corresponding to a stub, provides, as best shown in FIGS. 4 and 6 mounting for a bolt 30 projecting therefrom. Bolt 30 has a nut 32 on the opposite side of the board from the pipe end with a threaded projection on which sleeve 34 may be screwed to firmly clamp the bolt to the panel board. The shank 36 of the bolt projects outwardly through the sleeve 24 to provide pivotal mounting for the two pivotally connected portions of the clamp. The location of the bolt 30 on the panel and the displacement of the clamp from the panel by the dimensioning of sleeve 34 are such, in relation to the corresponding pipe end that the arcuate pivotally connected clamp members may be swung into clamping position and there will clamp the corresponding pipe end to a pipe abutting thereto with a washer therebetween.

It will be obvious that the pivotal mounting of the pivotted clamp on a panel board supported relative to a pipe end supported to be merely swung into position to perform a clamping operation thereon, greatly facilitates the completion of the pipe stub connection to another pipe.

The clamp shown, performs its clamping operation through a thumbscrew 40 on one pivotted member tightened on surface 42 of the other. It will be obvious that the invention applies to any means for drawing the pivotted members together about a connection.

The mounting and operation of the clamp has been described for the connection of a pipe end on a panel to another pipe. However it will be noted that, if a pipe end on a panel, is to be capped rather than connected to another pipe, the cap may be so held in place by the inventive clamp.

The embodiments of the invention in which an exclusive property or privilege is claimed are defined as follows:

1. A switching station for pipes comprising a panel equipped with at least one projecting pipe end and a clamp for each pipe end, said pipe end being of the type designed for connection to the pipe end of another pipe by said clamp, said clamp having a pair of members pivotally connected to each other about an axis of pivotal connection, said clamp members being designed and shaped to clamp over the connected pipe ends and to retain said pipe ends in connected position, and means to hold said clamp members in clamped position over said pipe ends, means pivotally mounting said clamp on the side of said panel from which said pipe end projects, the axis of pivotal mounting of said clamp on said panel coinciding with the axis of pivotal connection of said clamp members, said axis of pivotal mounting of said clamp being located so that said pair of clamp members may be swung into position to clamp the corresponding pipe end to the end of another pipe.

* * * * *